No. 844,227. PATENTED FEB. 12, 1907.
J. T. WRIGHT.
COMBINED CULTIVATOR, PLANTER, AND FERTILIZER DISTRIBUTER.
APPLICATION FILED SEPT. 10, 1906.
2 SHEETS—SHEET 1.
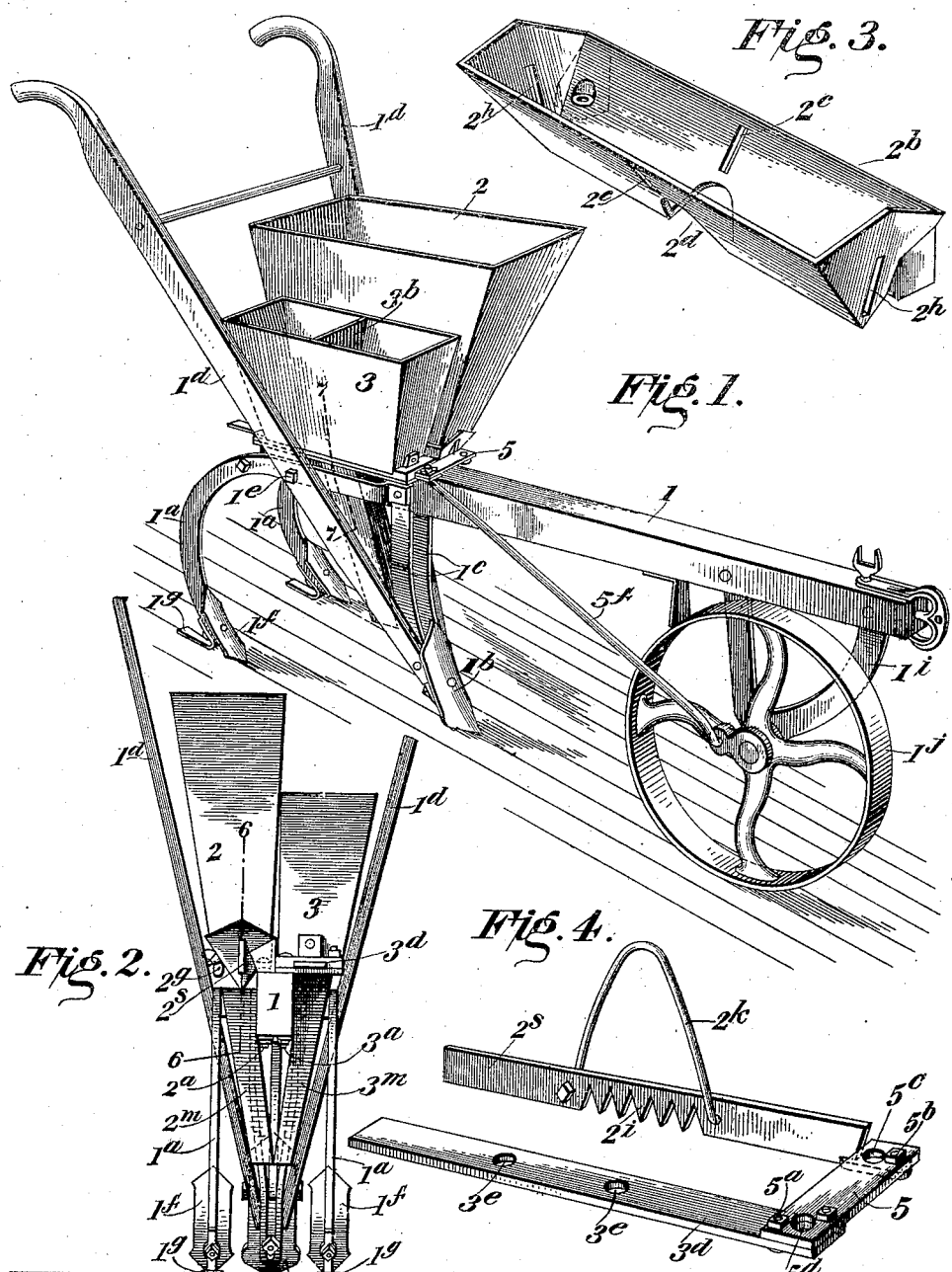
WITNESSES:
INVENTOR:
John T. Wright
By Alexander & Dowell
Attorneys No. 844,227. PATENTED FEB. 12, 1907.
J. T. WRIGHT.
COMBINED CULTIVATOR, PLANTER, AND FERTILIZER DISTRIBUTER.
APPLICATION FILED SEPT. 10, 1906.
2 SHEETS—SHEET 2.
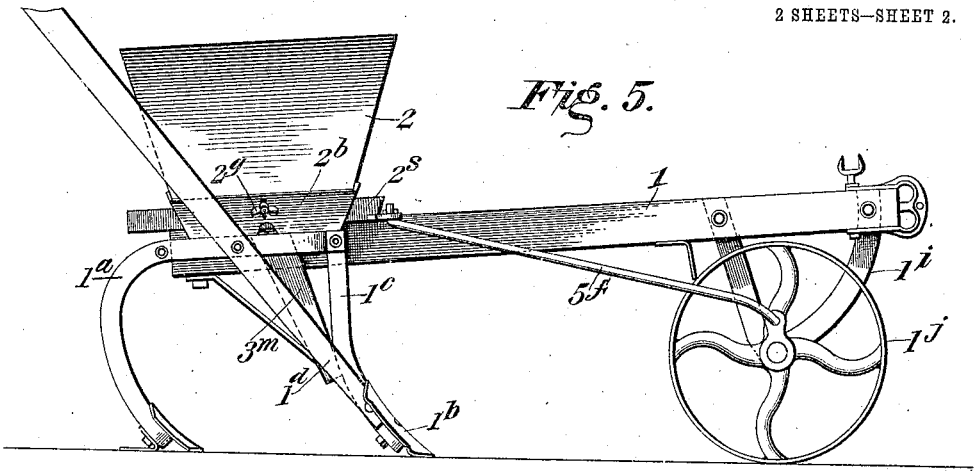
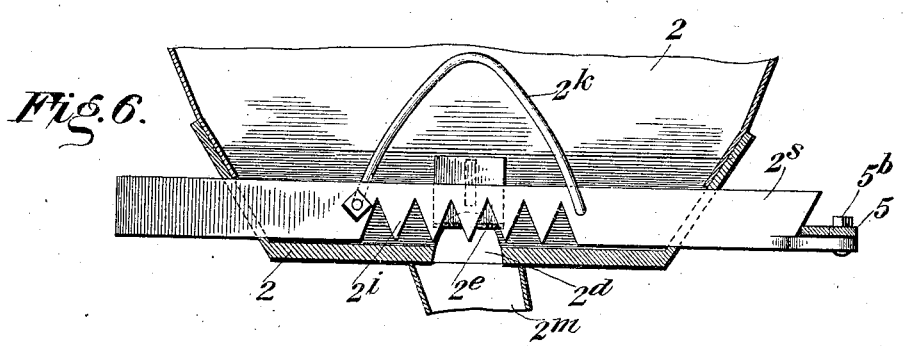
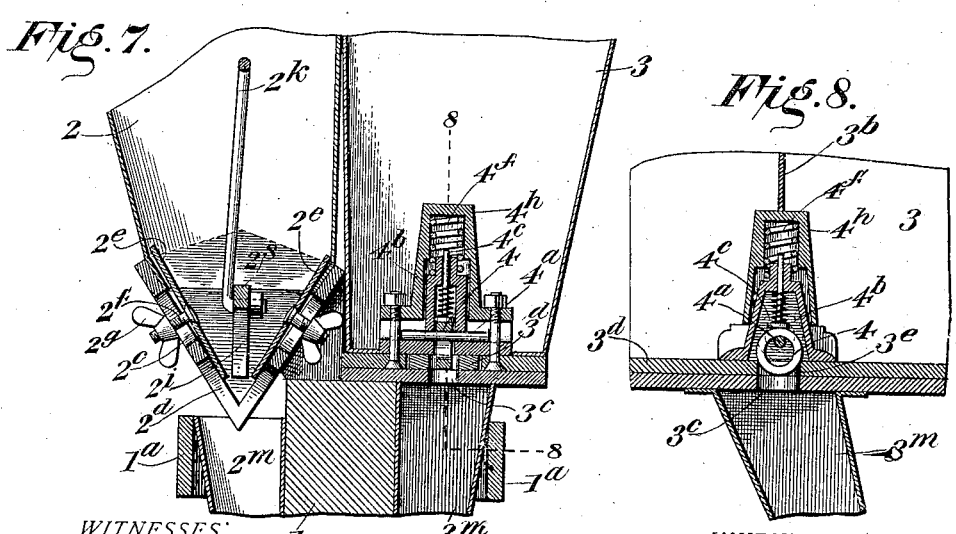
WITNESSES:
INVENTOR:
John T. Wright
By Alexander & Fowell
Attorneys.

UNITED STATES PATENT OFFICE.

JOHN THOMAS WRIGHT, OF COLUMBIA, TENNESSEE.

COMBINED CULTIVATOR, PLANTER, AND FERTILIZER-DISTRIBUTER.

No. 844,227.  Specification of Letters Patent.  Patented Feb. 12, 1907.

Application filed September 10, 1906. Serial No. 334,050.

*To all whom it may concern:*

Be it known that I, JOHN T. WRIGHT, of Columbia, in the county of Maury and State of Tennessee, have invented certain new and useful Improvements in Combined Cultivators, Planters, and Fertilizer-Distributers; and I hereby declare that the following is a full, clear, and exact description thereof, reference being had to the accompanying drawings, which form part of this specification.

This invention is an improvement in combined cultivators, planters, and fertilizer-distributer machines, and in particular is an improvement upon the machines for which I have obtained Letters Patent No. 426,354 of April 22, 1890, and No. 671,040 of April 2, 1901; and its objects are to provide a machine which is capable of planting a variety of seeds, either singly or together or in alternation, and also of supplying a fertilizer to the seed simultaneously with the planting thereof, and which may also be used to supply fertilizer to the grain while cultivating it.

The invention therefore consists in the novel construction and combination of parts hereinafter described with reference to the accompanying drawings, and the parts for which protection are desired are set forth in the claims.

In the drawings, Figure 1 is a perspective view of the complete machine. Fig. 2 is a rear elevation thereof. Fig. 3 is a detailed perspective view of the fertilizer or cotton-seed hopper. Fig. 4 is a perspective view of the feed and agitator slides detached. Fig. 5 is a side elevation showing the machine adjusted for sowing fertilizer or cotton-seed only. Fig. 6 is a detail section on line 6 6, Fig. 2. Fig. 7 is an enlarged transverse section on line 7 7, Fig. 1. Fig. 8 is an enlarged detailed section on line 8 8, Fig. 7.

The machine, as shown, comprises a beam 1, to which is attached the rear cultivator-bars $1^a$ and shovels $1^f$ and front furrow-opener $1^b$, which latter is attached to standards $1^c$, bolted to the beam 1. The lower ends of the handle-bars $1^d$ are fastened to the lower ends of the standards $1^c$ and are also connected at $1^e$ to the cultivator-bars $1^a$. These cultivator-bars $1^a$ are provided with shoes $1^g$ in rear of shovels $1^f$, which shoes extend rearwardly from the shovels and are adapted to hold the planter out of the ground when both hoppers are heavily loaded, so it will not plant the seed too deep for early germination, and for late germination I remove these.

The forward end of the cultivator-beam is provided with a bracket $1^i$, on which is mounted a wheel $1^j$, which operates the seed-slides in the usual manner, as hereinafter explained.

Mounted upon the beam, as shown in the drawings, are two hoppers 2 and 3. These hoppers are secured to the beam by bolts $2^a$ and $3^a$, as indicated in the drawings, so that they can be removed and transposed in position, if desired. As shown, hopper 2 is designed for fertilizer or cotton-seed and the like, and it is provided with a trough-shaped bottom (shown in detail in Fig. 3) which has a central opening $2^d$, the size of which opening is regulable by means of slides $2^e$, connected to the sides of the trough by means of bolts $2^f$ and thumb-nuts $2^g$, the bolts passing through slots $2^c$ in the sides of the bottom, as indicated in the drawings. Extending longitudinally through this trough-shaped bottom is an agitator-bar $2^s$, which is guided in vertical slots $2^h$ in the ends of the bottom, and this bar is provided with a central toothed or serrated portion $2^i$ on its under side, which is adapted to work between the slides $2^e$ and over the opening $2^d$, and thus feed more or less material through said opening $2^d$, according to the adjustment of the slides $2^e$. The bar $2^s$ is also provided with a bail $2^k$, which serves as an agitator to stir up the material above the bar and cause it to descend to the opening $2^d$. The material escaping through opening $2^d$ enters a spout $2^m$, by which it is directed downward to a point just in rear of the furrow-opener $1^b$. The other hopper 3 may be divided by a central partition $3^b$ into two compartments, as indicated in Fig. 1, and, if desired, different grains can be placed in the respective compartments. It has a central outlet-opening $3^c$ in its bottom, over which reciprocates a feed-slide $3^d$, which may be provided with two openings $3^e$, that will work in the opposite compartments and will alternately come over the opening $3^c$. Above this opening $3^c$ and slide $3^d$ is located a grain-discharge device which is adapted to force the grain from the openings $3^e$ in the slide through the opening $3^c$ into a feed-trough $3^m$, by which the grain is carried to a point in rear of the furrow-opener $1^b$, where it can be delivered with fertilizer from the spout $2^m$.

The grain-discharging device is more particularly illustrated in Figs. 7 and 8 and consists of a ring 4, hung on a pin 4$^a$, which is mounted in a movable casting 4$^b$, and is pressed down by a spring-actuated plunger 4$^c$, so that the ring may drop into the openings 3$^e$ sufficiently to force the grain therefrom and yet can ride up and out of the opening as the slide 3$^d$ is reciprocated without injury, the springs yielding. The casting 4$^b$ serves as a wiper for the slide 3$^d$ and is also yieldingly held down against the slide by means of a spring 4$^f$ interposed between the top of casting 4$^b$ and a housing 4$^h$, secured in the hopper 3 above the slide and opening, as shown in Figs. 7 and 8 of the drawings.

The feed-slides 2$^s$ and 3$^d$ are connected at their forward ends to a bar 5 by means of bolts 5$^a$ 5$^b$, the ends of said bar being perforated at 5$^c$ and 5$^d$ and the ends of the slides being similarly perforated, so that either of these perforations 5$^b$ 5$^c$ can be engaged by the rear end of a pitman-rod 5$^f$, the forward end of which is connected eccentrically to the wheel 1$^j$, as shown, so that the rotation of said wheel will cause the reciprocation of the slide.

The small hopper 3 can be used to contain corn, peas, or beans and sow all kinds of fine seed, such as millet, &c. The large hopper 2 can be used to sow fertilizer or cotton-seed, and when both hoppers are used I can sow fertilizer and plant corn or other seed at one operation.

By placing peas in one compartment of the hopper 3 and grain in the other I can plant a hill of grain and a hill of peas or beans halfway between the grain-hills, sowing fertilizer at the same time.

By removing the hopper 3 and reversing the fertilizer-hopper 2 and bolting it in the place of hopper 3 on the right-hand side of the beam, as indicated in Fig. 5, and connecting the pitman 5$^f$ direct to the agitator-slide 2$^s$ I can sow cotton or fertilizer alone.

The hopper 2, with its double inclined bottom and the serrated agitator or feeder 2$^s$, is one of the important features of the present invention. As the bottom of this hopper 2 is angular or V-shaped, the cotton-seed or fertilizer is compelled to slip down to the center between the teeth of the bar 2$^s$, and as the latter is reciprocated the seed or fertilizer is discharged at the outlet 2$^d$ into the furrow behind the opener-shovel and the two rear shovels 1$^f$ will cover it. The bail 2$^k$ will keep the fertilizer or cotton-seed stirred up, so that it will not pack in the upper part of the hopper.

It will be observed in the present case that the lower part of the handles 1$^d$ are fastened to the furrow-opener standards 1$^c$ at bottom and are fastened above to the coverer-bars 1$^a$. This makes the combination much stronger and the standard is much easier to handle. The two hoppers are upon the same beam, and by reason of the cross-bar connection between the feed-plates I can operate both from the one wheel, which is preferably placed in front, but might be located in the rear, if desired.

I claim—

1. In a planter, the combination of a beam, a hopper thereon having an angular or V-shaped bottom and an outlet-opening in said hopper, slides for regulating the size of said outlet-opening, a longitudinally-disposed serrated agitator-bar in the hopper-bottom extending across said opening, and means for reciprocating said bar.

2. In a planter, the combination of a hopper having its bottom approximately V-shaped in cross-section, and provided with an outlet-opening, a movable agitator-bar in said hopper extending across the opening and provided with serrations on its under side, an adjustable slide attached to the bottom for regulating the size of the outlet-opening, and means for operating the agitator-bar.

3. In a planter, the combination of a hopper having its bottom formed with oppositely-inclined walls and approximately V shape in cross-section, and having a central outlet, a longitudinally-movable agitator-bar extending across the opening and provided with serrations on its under side, adjustable slides attached to the bottom at opposite sides of the bar for regulating the size of the outlet-opening, and a pitman and crank-wheel, for operating the agitator-bar.

4. The combination of a hopper having an angular or V-shaped bottom and an outlet-opening in said hopper, means for regulating the size of said outlet-opening, and a serrated agitator-bar in the hopper-bottom extending across said opening; with a bow-shaped bail attached to said agitator-bar and adapted to stir the material in the hopper.

5. The combination of a cultivator-beam, a pair of hoppers mounted thereon, one of said hoppers having a V-shaped bottom provided with an outlet-opening, a reciprocating serrated feed-bar in said hopper, the second hopper being mounted on the beam beside the first hopper and having an outlet-opening, a feed-slide in said second hopper, a detachable connection between the feed-slides, and means for operating said slides.

6. The combination of a cultivator-beam having an opener-standard, a pair of hoppers bolted side by side upon said beam, one of said hoppers having a V-shaped bottom provided with an outlet-opening, a serrated feed-bar in said hopper, a feed-slide in the other hopper, a delivery-spout running from each hopper behind the opener-standard, a cross-bar connected to the feed-slide and agitator-bar, a crank-wheel and a pitman connecting the crank-wheel to said bar.

7 The combination of a beam, the furrowstructure in conformity with the gage of the road, substantially as described.

11. In a safety appliance for cars and locomotives, the combination of a supporting-beam, depending guide-plates provided with curved flanges connected to said beam, a journal-box, and a movable shoe provided with curved guide-grooves engaging with the projections on the guide-plates, substantially as described.

In testimony whereof I affix my signature in presence of two witnesses.

JAMES T. ANDREW.

Witnesses:
 MYRON G. CLEAR,
 G. L. CARY.